Patented June 3, 1930

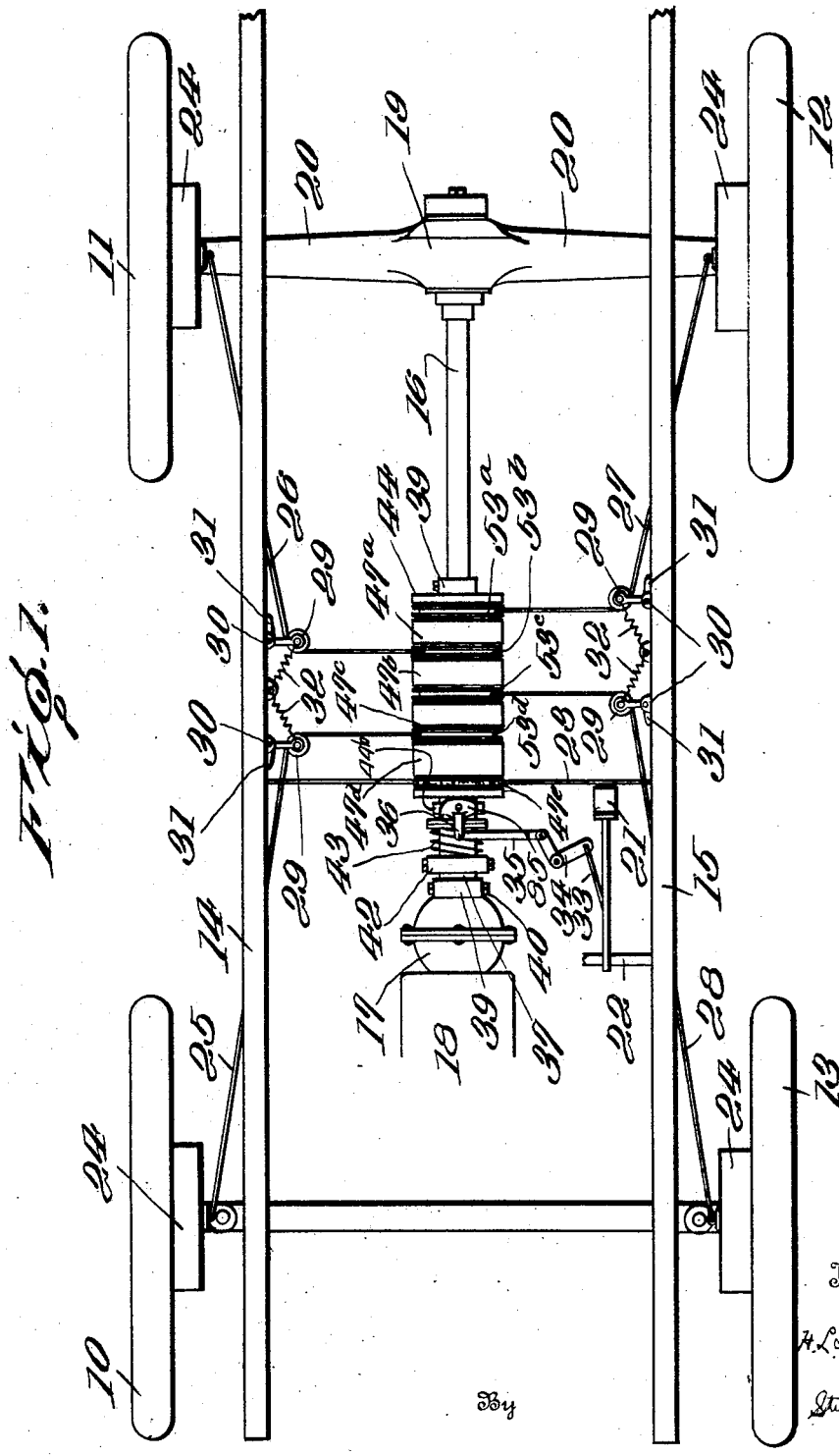

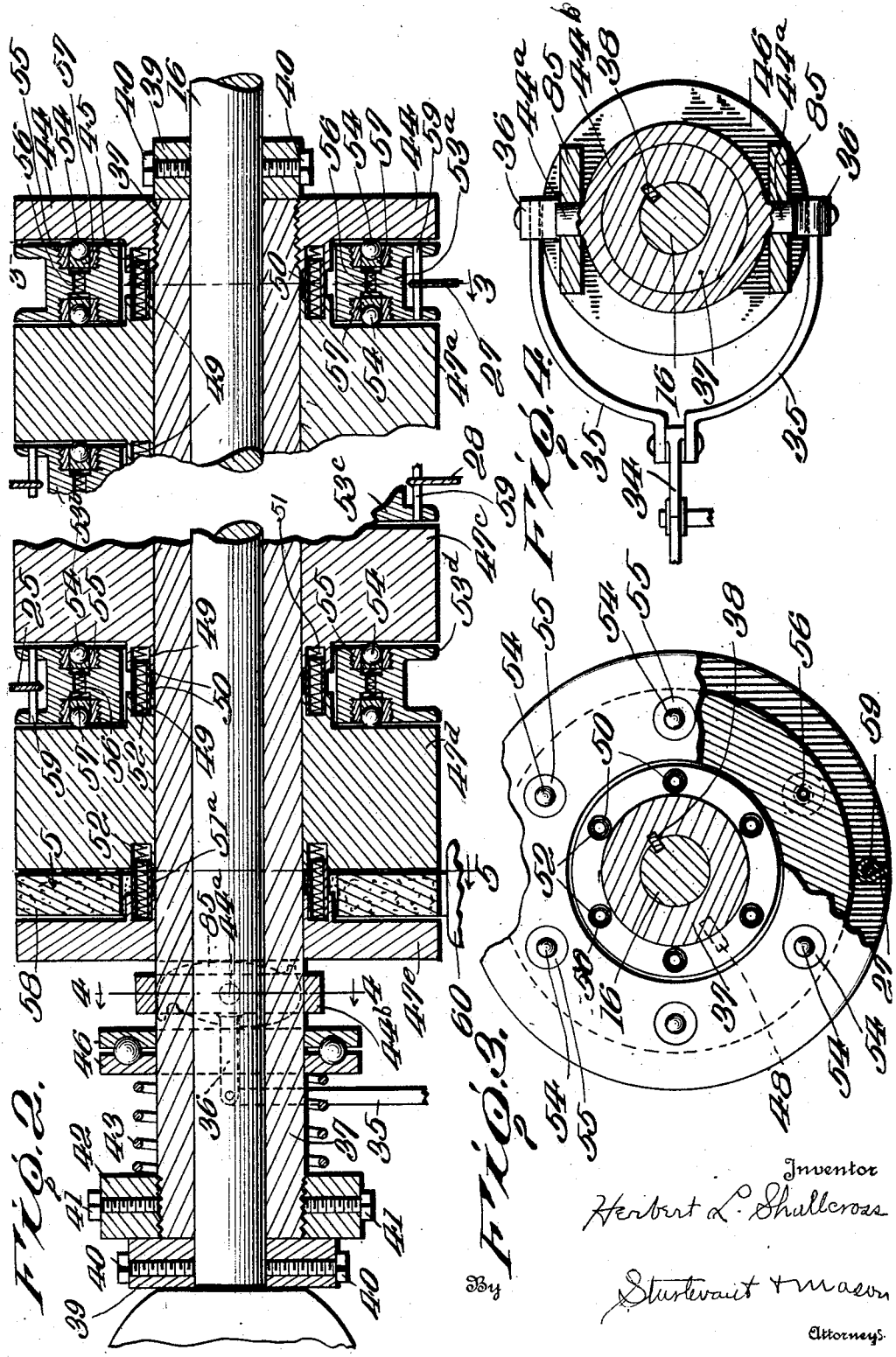

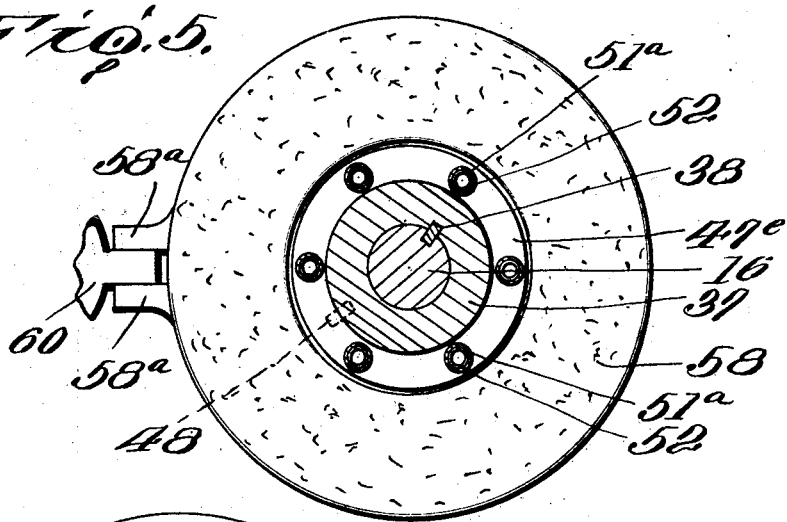
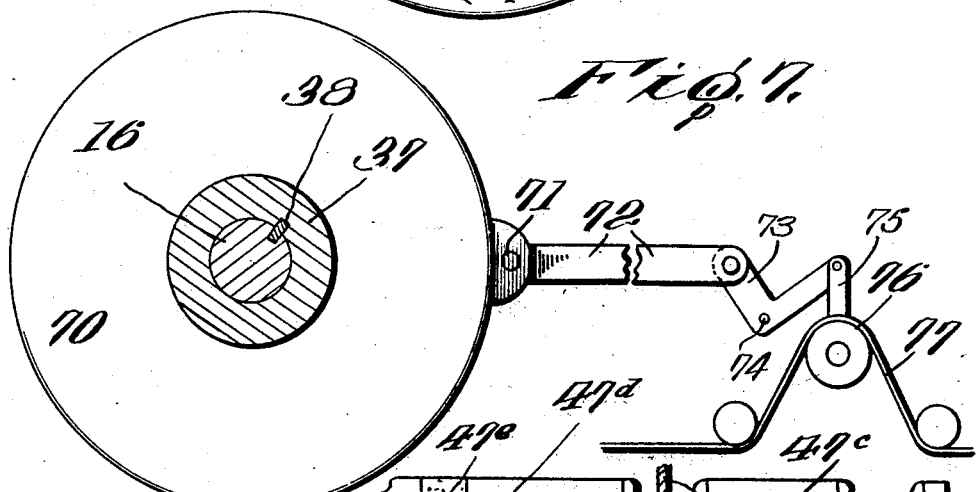
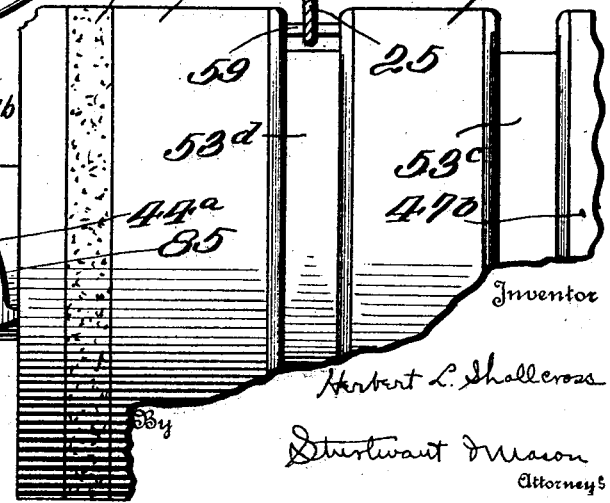

1,761,896

UNITED STATES PATENT OFFICE

HERBERT L. SHALLCROSS, OF PHILADELPHIA, PENNSYLVANIA

POWER BRAKE

Application filed September 3, 1925. Serial No. 54,194.

This invention relates to improvements in power brakes for vehicles, and more particularly to the mechanism for actuating the same.

Heretofore several proposals have been made for the installation of power brakes upon vehicles, by which the power of a driving engine or the inertia of the vehicle itself was employed to tighten a brake band or shoe upon a wheel or drum. These structures have had the disadvantage of requiring frequent manual adjustment of the connective cables or rods to compensate wear and stretching; and a similar adjustment with great care was required to prevent the application of one brake more than another. The customary location of such actuating devices was such that they could be driven from the engine, through some clutching system.

According to the present invention, a power brake actuating mechanism is provided which consists of a drum mounted upon a shaft connected positively with a ground wheel of the vehicle, so that as long as the vehicle is moving, the shaft is rotating, and the drum may be engaged for actuation of the brake. It is preferred to provide such a drum upon the transmission shaft of an automotive vehicle, at an appropriate point, so that the drum may be coupled for rotation by the shaft by depression of the customary brake pedal of the vehicle. Further, compensating means are provided between the shaft and the connective cables or rods, so that the actuating effort upon the brakes proper may be equalized. In addition thereto, means are provided to take up the slack of such connective cables or rods at all times, so that the brake application is smooth and gradual, and not irregular and jerky. A further feature of the invention is the provision of a transmission brake mechanism in connection with the aforesaid wheel brake mechanism. The structure is also provided with a safety means by which no seizing or binding is possible in the engagement of the several drums for actuation by the shaft. Another feature is the provision of spacing and bearing means to prevent frictional dragging of the drum upon the shaft during normal propulsion of the vehicle.

With these and other objects in view as will appear in the course of the following specification and claims, on the accompanying drawings:

Fig. 1 is a plan view of an automobile frame with the arrangement of the structure shown in diagrammatic presentation.

Fig. 2 is a longitudinal section of the actuating mechanism.

Fig. 3 is a transverse section on line 3—3 of Fig. 2.

Fig. 4 is a transverse section on line 4—4 of Fig. 2.

Fig. 5 is a transverse section on line 5—5 of Fig. 2.

Fig. 6 is an elevation of a part of the actuating mechanism, showing the operating cam.

Fig. 7 is a view showing a modified form of the invention, in diagram and transverse section.

In Fig. 1, the power brake is illustrated as applied to the braking of the four wheels 10, 11, 12, 13 of an automobile represented by the frame members 14, 15, and having the transmission shaft 16 extending from the universal joint 17 at the rear end of the usual transmission housing 18 to the differential 19 mounted on the rear axle 20 to drive the rear wheels 11, 12. The brake pedal 21 is pivoted at 22 to some suitable part of the frame. The cross-web or stiffener 23 extends between the frame members 14, 15 and is fixedly connected thereto.

A brake drum 24 is provided upon each of the wheels 10, 11, 12, 13, and is so arranged that by traction upon the cables 25, 26, 27, 28, the brake elements are drawn tight upon the drums, so that a braking action results. Since the manner in which this movement occurs forms no part of the present invention, it need not be described in further detail.

Each of the cables 25, 26, 27, 28 passes over a tension pulley 29 which is pivoted at any suitable part of the frame at 30, and have the stop elements 31 associated therewith to determine an end point of their movements when the respective cables are drawn tight. The tension springs 32 are connected to the respective pulleys to maintain the cables against sagging or slackness when the brakes are released; the tension of these springs is insufficient to counteract the releasing springs as customarily employed with the brake bands or blocks to release the same from their respective drums.

The brake pedal 21 is connected by a link 33 with a crank lever 34 which is pivoted upon the frame, and in turn is connected by a pair of bowed links 35 (Fig. 4) with the lever arms 36, as will be described hereinafter.

A sleeve 37 is mounted to closely embrace the transmission shaft 16, and is keyed to turn therewith by the key 38 in Figs. 3 and 4. This sleeve is held in a proper position along the length of this shaft 16 by the bushings 39 which are secured to the shaft by the set screws 40. Fixedly mounted by threading and set screws 41 at the forward end of the sleeve is a further bushing 42 which serves as a counter-support for the coil spring 43 of heavy cross-section. Fixedly mounted on the rearward end of the sleeve is a collar 44 which has a central forwardly extended circular section 45.

A ball thrust bearing 46 is provided to receive the thrust of the end of the spring 43. Disposed around the sleeve 37 adjacent this thrust bearing is a bearing collar $44^b$ which provides the fulcrums $44^a$ for the lever arms 36 which carry rigidly therewith the cams 85; this collar is free to turn and to move longitudinally upon the sleeve.

As shown in Fig. 2, a series of collars $47^a$, $47^b$, $47^c$, $47^d$, are provided for sliding movement longitudinally with regard to the sleeve 37, but held against rotation with regard thereto by the key 48: these collars $47^a$, $47^b$, $47^c$, $47^d$, therefore turn with the same speed as the transmission shaft at all times. Each of these collars $47^a$, $47^b$, $47^c$, $47^d$, is provided centrally with the longitudinally extending circular sections 49 of the same diameter as the section 45. In each of these collars is provided a series of apertures 50 to receive the coil springs 51. The tubes 52 are freely slidable within the apertures and around the springs, and serve to hold the springs 51 against lateral displacement. As the collars 47 approach each other, the tubes 52 enter the collars; and the relations of the several parts are so selected that before the tubes extend from the bottom of the cavity in one collar to the bottom of the adjacent collar, the two collars will have come in contact at the end faces of the peripheral sections: in this way a crushing of the tubes 52 is avoided.

Mounted in the peripheral grooves afforded between each pair of collars are the apertured drums $53^a$, $53^b$, $53^c$, $53^d$, equal in number to the number of brakes to be applied whose end faces are parallel to and adapted to contact with the outer end faces of the collars 44, $47^a$, $47^b$, $47^c$, $47^d$. The inner diameter of each drum allows it a running fit upon the peripheral surfaces of the respective circular sections 49 and 45. In order to avoid great frictional losses, each face of the drums 53 carries a series of ball bearings 54 mounted in the threaded bushings 55, and pressed outward by the springs 56, which act upon the followers 57.

A further collar $47^e$ is disposed about the sleeve 37 adjacent the bearing collar $44^b$, and has a central circular section 49 like those of the collars $47^a$, $47^b$, $47^c$, $47^d$. Mounted in the peripheral groove between the collars $47^e$ and $47^d$ is a fibre friction disk 58. The coil springs $51^a$ mounted between these disks are like those at 51 between the other disks, but preferably are slightly weaker. The fibre disk 58 has a pair of projecting fins $58^a$ which engage about a guide 60 mounted on the stiffening web 23 of the frame, so that the disk is held against rotation about the axis of the transmission shaft 16, but is permitted to move longitudinally with regard thereto.

It is preferred to make the total force presented by the several springs 51, $51^a$, slightly less than the force presented by the single safety spring 43, so that the movement occasioned by the cams, as will be described hereinafter, will normally act substantially upon the collar springs 56 to cause the collars and drums to come into contact, before the spring 43 has been compressed to any great amount.

A pin 59 in the periphery of each of the drums has one of the cables 25, 26, 27, 28 fastened thereto, so that when the drum is rotated in either direction, the cable is drawn tight.

The cams 85 are provided with an upturned tip $85^a$ as shown in Fig. 6, to prevent the cam being carried beyond center.

The method of operation of this mechanism is as follows:

In the normal running condition of the parts, the spring 43 and the series of springs 51, $51^a$ and 56 are without compression. The ball bearings 54 hold the drums $53^a$, $53^b$, $53^c$, $53^d$, out of frictional contact with the collars 44, $47^a$, $47^b$, $47^c$, $47^d$, and the fibre disk 58 is out of operative contact with the walls of the adjacent collars $47^d$, $47^e$. The cam bearing collar $44^b$ is held centrally of the space between the ball thrust bearing 46 and the collar $47^e$. The cables pertaining to each of the drums $53^a$, $53^b$, $53^c$, $53^d$ extend from the respective drum substantially in a direction radial to the axis of the drums; and these cables are held without slack or traction upon the braking blocks or bands by the springs 32. This condition of the parts is represented in Fig. 2, in which it will be seen that the relative tensions of the springs may be adjusted by the collars 42 and $44^b$.

When it is desired to apply a braking effort to the vehicle, the brake pedal 21 is depressed, thus actuating the link 33, the crank 34, the link 35, and the lever arms 36 and the cams 85. The cams rotate about their pivots or fulcrums 44$^a$, and present their faces against the ball thrust bearing 46 and the end collar 47$^e$, thus increasing the separation between the two latter elements. Since the spring 43 yields but slightly, and the groups of springs 51, 51$^a$ and 56 associated with the collars yield greatly, the collar 44$^b$ supporting the cams 85 and the lever arms 36 will move longitudinally upon the sleeve 37 and establish and maintain a central relation of the collar 44$^b$ in the space between the thrust bearing and the collar 47$^e$.

The pressure of the cams upon the collar 47$^e$ will be transmitted therethrough to the succeeding collar 47$^d$ by the springs 51$^a$, and so on, so that the relative movement between each pair of collars 47$^c$, 47$^d$, 47$^e$, 47$^b$, etc. is substantially uniform; as mentioned above, the springs 51$^a$, however, may be somewhat weaker than those at 51 so that collars 47$^e$, 47$^d$ clamp the disk 58 before any drum is clamped.

The first effect of the compression of the collars toward each other is then to cause the collars 47$^e$, 47$^d$ to be pressed against the fibre disk 58 which is attached to the frame of vehicle as set forth above. This exerts a primary braking action upon the transmission shaft, independently of any braking action upon the wheel brake drums.

In the longitudinal movement of the collars, the springs 51$^a$, 51 and 56 are compressed, and the collars move closer together; and finally pass into contact with the faces of the drums 53$^a$, 53$^b$, 53$^c$, 53$^d$; and cause the latter to rotate by frictional engagement. Since the springs 51 have substantially the same power, and the movement permitted each of the collars is uniform, the various drums will all be engaged at the same instant, and with the same frictional pull. Each of the drums pulls upon its attached cable 25, 26, 27, 28 respectively, and tightens the brake shoe or band at the respective wheels 10, 11, 12, 13: hence the braking effort is uniformly at the several wheels, and since this effort is produced by individual drums each in frictional contact with separate faces of the collars, which in turn are driven positively, each drum will first take up any slack in its cable until the springs 32 are drawn tight, and the pulleys 29 are held in a fixed position by the spurs 31. This is done upon the first slight application. The action of the springs 32 prevents a rapid rotation of the drums until the slack is taken up from the cables 25, 26, 27, 28 with a subsequent jerky application of the brakes which may differ for the several wheels. Thereafter the drum is given a greater and greater rotation by the increasing frictional contact between drum and collars, which at all times is uniform among the several drums.

When the brake pedal is released, the cams are returned to the original position by the pressures of the springs 43, 51, 51$^a$, and 56; and the drums center themselves in the space between the adjacent collars by the outward thrust of the ball bearings 54 by the springs 56, whereby the frictional engagement is eliminated, and the drums can turn back freely. The return springs of the brake mechanism release the brakes and retract the cables 25, 26, 27, 28 to the original position; and the springs 32 take up any existing slack, so that the next braking operation, begun in either direction of travel, may take place immediately upon actuation of the brake pedal.

So long as the vehicle is moving, the transmission shaft is rotating, and hence power is available for the braking, whether or not the engine is revolving. This power is available up to the amount of stopping; and the brakes are held engaged by the frictional resistance between the elements so long as the pedal is depressed. If breakage occurs between the front end of the transmission shaft and the wheels, and the engine is turning over, a braking effort may be produced with the engine in gear, in the same manner as before.

The above operation occurs in either direction of motion of the vehicle, since in the normal or non-braking position, the cable is attached to the pin 59 of the drum and extends therefrom in a line passing substantially through the axis of the shaft 16. The movement of the drum in either direction will cause a traction upon the cable, since no winding up of the cable upon the drum is contemplated, the movement of the cable necessary for braking normally being less than a quarter circumference of the drum.

The mechanism described above refers to the use of four drums to apply individually the brakes on all four wheels of a vehicle. The same type of mechanism may likewise be employed with fewer drums to apply only the brakes on two wheels, without change of the principle of construction.

In Fig. 7 is shown a modified form of the apparatus, in which a plurality of brakes may be applied from a single drum. In this case the drum 70 is provided at its periphery with a pin 71, which is connected by a link 72 with a crank arm 73 pivoted at 74 to the frame of the vehicle. The other arm of the crank is connected by a link 75 to the pulley 76, over which passes the cable 77 which is connected at each end to a brake band or shoe in the usual manner. The operation is substantially the same as before: when the drum rotates, the link 72 is pulled, which through the crank 73 and the link 75 pulls upon the pulley 76 and causes an equalized tightening of the cable 77 at both ends and thus an application of the brakes.

Obvious changes may be made in the form of construction without departing from the scope of the appended claims.

Having thus fully described the invention, what I claim is:

1. In a power brake for a vehicle having a rotating shaft, a pair of collars surrounding and driven by the shaft, a drum mounted between said collars, a plurality of circumferentially spaced springs to normally hold said collars separated from said drum, means to press said collars into frictional contact with said drum to produce the rotational movement of the latter, and a brake cable attached to said drum.

2. In a power brake for a vehicle having a rotating shaft, a collar surrounding and driven by the shaft, a drum loosely mounted upon the shaft, a friction disk loosely mounted upon the shaft and held substantially against rotation with regard to the frame of the vehicle, a brake cable attached to said drum, means to press said collar, said drum and said disk into contact, whereby primarily a braking effect is produced upon said collar and secondarily a traction is produced by said drum upon said brake cable.

3. In a power brake, a rotating shaft, a plurality of collars, and a plurality of drums mounted upon the shaft, means to cause said collars to rotate with the shaft, a device to bring said collars and drums together whereby the latter are rotated frictionally by the former, a flexible means connecting each of said drums with a brake, and means to take up the slack in each of said flexible means, whereby said cables are tensed equally by movement of said drums in either direction.

4. In a power brake for a vehicle having a rotating shaft, a plurality of collars keyed to rotate with said shaft, adjacent collars having flanges directed toward one another, a plurality of drums located on said flanges so that the collars may turn within the respective interposed drum disposed individually between pairs of said collars, means cooperating between said flanges to hold said drums normally out of contact with said collars, means to resiliently press said drums into frictional engagement with said collars, and means to connect said drums to the brake mechanisms of the vehicle.

5. In a power brake for a vehicle having a transmission shaft, a sleeve keyed to rotate with said shaft, a plurality of sliding collars keyed to rotate with said sleeve, means normally holding said collars separated, a plurality of drums disposed individually between pairs of said collars, spring-pressed ball bearings to hold said drums and collars normally out of frictional engagement, a safety spring mounted upon said sleeve, a thrust bearing, a supporting bushing adapted to slide upon the sleeve, a cam carried by said bushing and in operative contact with said thrust bearing and the end collar, means connecting the brake pedal of the vehicle to actuate said cam, a cable extending from each of said drums to a brake mechanism of the vehicle, and means to take up the slack in each of said cables, whereby said cam upon actuation from said pedal presses said collars and drums into operative frictional contact against the thrust of said safety spring, to effect a traction of said cables.

6. In a power brake for a vehicle having a rotating shaft, a collar surrounding and driven by the shaft, a drum coaxial with said shaft and having a face in complemental relation to the face of said collar, ball bearings disposed to normally separate said faces whereby said collar may move independently of said drum, means to press said drum and collar into frictional engagement with each other whereby the latter is rotated by the former, a brake cable connected to said drum, and means to hold said bearings whereby said frictional engagement may be permitted to the exclusion of said independent movement.

7. In a power brake for a vehicle having a rotating shaft, a plurality of collars surrounding and driven by said shaft, a drum coaxial with said shaft and having faces each in complemental relation to a face of one of said collars, ball bearings disposed to normally separate said faces whereby said collars may move independently of said drum, spring means to hold said bearings in such position, means to press said drum and collars into frictional engagement with each other against the action of said spring means, and a brake cable connected to said drum.

8. In a power brake for a vehicle having a plurality of brakes and a rotating shaft, a plurality of drums loosely mounted about said shaft, a device connected to each of said drums to actuate each its respective brake, means to frictionally drive said drums collectively from said shaft whereby each drum may move a distance varying from that of another until substantially the same braking effort is produced by said devices, and means including a spring to resiliently bring said driving means into operative condition.

9. In a power brake for a vehicle having a plurality of brakes and a rotating shaft, a frictional driving member driven by said shaft, devices connected to each of said brakes and including a balancing mechanism whereby equal braking efforts are delivered to each of said brakes, friction means adapted to cause the actuation of said devices from said member, resilient means acting upon said friction means to produce the actuation of said devices from said member, and means to free said devices from actuation by said member upon release of said actuating means.

10. In a power brake for a vehicle having a rotating shaft, a pair of collars surrounding and driven by the shaft, a drum mounted coaxially with and between said collars, a spring located and acting between said collars to normally hold said collars separated from each other by a greater distance than the axial thickness of said drum, spring pressed means carried by said drum and acting upon said collars to hold the end surfaces of the drums separated from the adjacent surfaces of the collars, means to press said collars into frictional contact with said drum whereby said surfaces establish a frictional driving relationship whereby to rotate the drum, and a brake connection attached to said drum.

11. In a power brake for a vehicle having a rotating shaft, a pair of collars surrounding and driven by the shaft, a drum mounted coaxially with and between said collars, a spring located and acting between said collars to normally hold said collars separated from each other by a greater distance than the axial thickness of said drum, said drum having passages extending between the end faces thereof, ball bearings located in said passages and a spring acting upon the ball bearings whereby the ball bearings are normally forced outward by said spring to space said drum from said collars and produce a substantially frictionless relationship between said drum and rollers, means to press said collars into frictional contact with said drum whereby said surfaces establish a frictional driving relationship whereby to rotate the drum, and a brake connection attached to said drum.

12. In a power brake for a vehicle having a rotating shaft, a collar keyed on to rotate with said shaft, a drum about said shaft adjacent said collar, means to hold said drum normally out of contact with said collar, means to resiliently bring said drum into frictional engagement with said collar whereby to rotate the drum, and means to connect said drum to the brake mechanism of the vehicle.

13. In a power brake for a vehicle having a rotating shaft, a pair of collars located on and keyed to rotate with said shaft, a drum disposed about said shaft between said collars, means to normally hold said drum out of frictional driving contact with said collars, a spring adapted to bring said drum and collars into frictional driving contact, said means and spring in the normal position of the elements of said brake being balanced against each other so that the collars and drum are spaced one from another, and means to increase the tension of said spring whereby resiliently to bring said collars and drum into frictional engagement with one another, and means to connect said drum to the brake mechanism of the vehicle.

14. In a power brake for a vehicle having a rotating shaft, a plurality of collars keyed to rotate with the shaft, said collars presenting adjacent spaced end faces and reduced portions, a drum journalled on said reduced portions and having end faces opposite the end faces of the collars, means to separate the drums and collars axially with respect to the shaft, means to bring the drums and collars together for driving contact, and a brake connection from said drum to the brake mechanism of the vehicle.

15. In a power brake for a vehicle having a rotating shaft, an axially movable collar and a fixed collar keyed to rotate with said shaft, a drum mounted between said collars and coaxial with the shaft, a stop on said shaft spaced from said fixed collar, said movable collar and drum being mounted between said fixed collar and said stop, a spring between said stop and movable collar, means operating between the spring and movable collar to force the drums and collars together whereby to produce a driving relationship between said collars and drums, and means to connect said drum to the brake mechanism of the vehicle.

16. In a power brake for a vehicle having a rotating shaft, a collar fixed on said shaft, a stop fixed on said shaft and spaced from said collar, a drum mounted between said collar and stop, a spring between said stop and collar, means operating between the spring and collar to move said drum, and means to connect said drum to the brake mechanism of the vehicle.

17. In a power brake for a vehicle having a rotating shaft positively connected with a wheel of the vehicle, said vehicle having a brake and brake actuating means connected to said brake and to the frame, a drum, said brake means also having a connection to the drum at a point opposite the frame connection when the drum is in the unoperated position so that movement of the drum in either direction will actuate the brake means to apply the brake, a collar fixed to said shaft, means to bring said drum and collar together for the movement of said drum according to the direction of movement of the vehicle, and means to return said drum from operated to unoperated position.

In testimony whereof, I affix my signature.
HERBERT L. SHALLCROSS.